United States Patent
Kobayashi et al.

(10) Patent No.: US 12,365,049 B2
(45) Date of Patent: Jul. 22, 2025

(54) MACHINE LEARNING METHOD USED FOR LASER PROCESSING SYSTEM, SIMULATION APPARATUS, LASER PROCESSING SYSTEM AND PROGRAM

(71) Applicant: THE UNIVERSITY OF TOKYO, Tokyo (JP)

(72) Inventors: Yohei Kobayashi, Tokyo (JP); Shuntaro Tani, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 782 days.

(21) Appl. No.: 17/265,667

(22) PCT Filed: Aug. 5, 2019

(86) PCT No.: PCT/JP2019/030695
§ 371 (c)(1),
(2) Date: Feb. 3, 2021

(87) PCT Pub. No.: WO2020/031948
PCT Pub. Date: Feb. 13, 2020

(65) Prior Publication Data
US 2021/0299788 A1    Sep. 30, 2021

(30) Foreign Application Priority Data
Aug. 6, 2018 (JP) .................. 2018-147383

(51) Int. Cl.
*B23K 26/36* (2014.01)
*B23K 26/062* (2014.01)
(Continued)

(52) U.S. Cl.
CPC ............ *B23K 26/36* (2013.01); *B23K 26/062* (2015.10); *G01B 11/24* (2013.01); *G05B 13/027* (2013.01);
(Continued)

(58) Field of Classification Search
CPC ...... B23K 26/36; B23K 26/062; G01B 11/24; G05B 13/027; G05B 13/042;
(Continued)

(56) References Cited

U.S. PATENT DOCUMENTS

2007/0023944 A1*  2/2007  Mika ................. G05B 19/4097
                                                              264/42
2012/0290276 A1* 11/2012  Schulz .................. B23K 26/38
                                                              703/2
(Continued)

FOREIGN PATENT DOCUMENTS

EP     2 944 414 A1    11/2015
JP     2007-090352 A    4/2007
(Continued)

OTHER PUBLICATIONS

Mills et al., "Predictive capabilities for laser machining via a neural network," Optics Express vol. 26, No. 13, Jun. 25, 2018 (Year: 2018).*

(Continued)

*Primary Examiner* — Miranda M Huang
*Assistant Examiner* — Yao David Huang
(74) *Attorney, Agent, or Firm* — Oliff PLC

(57) ABSTRACT

Deep learning is performed by using a material of a processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam. A first relationship of input data that are the material of the processing object, the pre-processed part data, and the laser beam parameter to output data that is the post-processed part data (Continued)

after irradiation with the laser beam in relation to the input data is accordingly obtained as one learning result.

18 Claims, 10 Drawing Sheets

(51) Int. Cl.
    *G01B 11/24*      (2006.01)
    *G05B 13/02*      (2006.01)
    *G05B 13/04*      (2006.01)
    *G05B 19/4099*      (2006.01)
    *G06N 20/00*      (2019.01)

(52) U.S. Cl.
    CPC ....... *G05B 13/042* (2013.01); *G05B 19/4099* (2013.01); *G06N 20/00* (2019.01); *G05B 2219/45041* (2013.01)

(58) Field of Classification Search
    CPC ...... G05B 19/4099; G05B 2219/45041; G05B 2219/4504; G06N 3/02; G06N 20/00; G06F 30/20
    See application file for complete search history.

(56) References Cited

U.S. PATENT DOCUMENTS

| | | | |
|---|---|---|---|
| 2015/0336209 A1 | 11/2015 | Yamashita et al. | |
| 2017/0270434 A1 | 9/2017 | Takigawa et al. | |
| 2018/0032835 A1* | 2/2018 | Shirahata | G06F 18/21 |
| 2018/0147665 A1 | 5/2018 | Furuya | |
| 2019/0130253 A1* | 5/2019 | Schultz | D06P 5/15 |
| 2019/0384964 A1* | 12/2019 | Ando | G06V 20/647 |

FOREIGN PATENT DOCUMENTS

| | | |
|---|---|---|
| JP | 2014-133248 A | 7/2014 |
| JP | 2017-164801 A | 9/2017 |

OTHER PUBLICATIONS

Gilbert et al., "A time based method for predicting the workpiece surface micro-topography under pulsed laser ablation," Journal of Materials Processing Technology 214 (2014) 3077-3088 (Year: 2014).*
Yousef et al., "Neural network modeling and analysis of the material removal process during laser machining," Int J Adv Manuf Technol (2003) 22: 41-53 (Year: 2003).*
Parandoush et al., "A review of modeling and simulation of laser beam machining," International Journal of Machine Tools & Manufacture 85 (2014) 135-145 (Year: 2014).*
Salonitis et al., "A theoretical and experimental investigation on limitations of pulsed laser drilling," Journal of Materials Processing Technology 183 (2007) 96-103 (Year: 2007).*
Heath et al., "Machine learning for 3D simulated visualization of laser machining," vol. 26, No. 17, Aug. 20, 2018, Optics Express 21574 (Year: 2018).*
Tani et al., "Pulse-by-pulse depth profile measurement of femtosecond laser ablation on copper," Applied Physics A (2018) 124:265 (Year: 2018).*
Liu et al., "Interactive 3D Modeling with a Generative Adversarial Network," 2017 International Conference on 3D Vision (3DV) (Year: 2017).*
Wang et al., "Shape Inpainting using 3D Generative Adversarial Network and Recurrent Convolutional Networks," 2017 IEEE International Conference on Computer Vision (ICCV), Oct. 22-29, 2017. (Year: 2017).*
Oct. 29, 2019 Search Report issued in International Patent Application No. PCT/JP2019/033695.
Ciurana et al., "Neural Network Modeling and Particle Swarm Optimization (PSO) of Process Parameters in Pulsed Laser Micromachining of Hardened AISI H13 Steel," Materials and Manufacturing Processes, vol. 24, 2009, pp. 358-368.
Sivarao et al., "Neural Network Multi Layer Perceptron Modeling of Surface Quality in Laser Machining," International Conference on Intelligent and Advanced Systems, 2007, pp. 81-86.
Omidvar et al., "Selection of Laser Bending Process Parameters for Maximal Deformation Angle through Neural Network and Teaching-Learning-Based Optimization Algorithm," Soft Comput, vol. 19, 2015, pp. 609-620.

* cited by examiner

MACHINE LEARNING METHOD USED FOR LASER PROCESSING SYSTEM, SIMULATION APPARATUS, LASER PROCESSING SYSTEM AND PROGRAM

TECHNICAL FIELD

The present disclosure relates to a machine learning method used for laser processing system, simulation apparatus, laser processing system and program.

BACKGROUND

One proposed technique with regard to machine learning used for this type of a laser processing system is a machine learning apparatus provided with a quantity of state observing portion configured to observe a quantity of state of the laser processing system, an operation result obtaining portion configured to obtain a processing result by the laser processing system, a learning portion configured to receive an output from the quantity of state observing portion and an output from the operation result obtaining portion and learn laser processing condition data in relation to the quantity of state and the processing result of the laser processing system, and a decision making portion configured to refer to the laser processing condition data learnt by the learning portion and output the laser processing condition data (as described in, for example, Patent Literature 1). This apparatus is regarded to determine the laser processing condition data that assures the optimum processing result by such machine learning.

CITATION LIST

Patent Literature

PTL1: JP 2017-164801A

SUMMARY

Technical Problem

As shown in FIG. 13, in laser processing, it has been known that the ablation volume (removal volume) ablated from a processing object increases non-linearly against the number of irradiation pulses and also increases non-linearly against the fluence (pulse energy per unit area) of laser beam to irradiate the processing object. Accordingly, even when the processing object is irradiated with laser beam by using a set parameter, it is extremely difficult to estimate the degree of ablation processing caused by irradiation with laser beam and to determine the setting of the parameter of laser beam in order to perform specific processing of the processing object. The machine learning apparatus described above is regarded to determine the laser processing condition data that assures the optimum processing result. Such learning is, however, merely learning in relation to the result of laser processing. This apparatus does not perform any learning in relation to the degree of processing of the processed part before and after irradiation with laser beam in the course of laser processing.

A main object of a machine learning method used for a laser processing system according to the present disclosure is to learn the degree of processing of a processed part before and after irradiation with laser beam in the course of laser processing, the material of a processing object, and a parameter of laser beam to irradiate the processing object.

A main object of a simulation apparatus used for the laser processing system according to the present disclosure is to perform simulation using the results of the learning of the degree of processing of the processed part before and after irradiation with laser beam in the course of laser processing, the material of the processing object, and the parameter of laser beam to irradiate the processing object.

A main object of the laser processing system according to the present disclosure is to enhance the accuracy of laser processing.

A main object of a program according to the present disclosure is to cause a computer to serve as a machine learning apparatus that learns the degree of processing of the processed part before and after irradiation with laser beam in the course of laser processing, the material of the processing object, and the parameter of laser beam to irradiate the processing object.

Solution to Problem

In order to achieve the above main object, the machine learning method used for laser processing system, simulation apparatus, laser processing system and program of the disclosure is implemented by an aspect described below.

The present disclosure is directed to a machine learning method used for a laser processing system that is configured to perform ablation processing by irradiating an object to be processed or a processing object with laser beam. The machine learning method includes performing deep learning by using a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, and obtaining, as one learning result, a first relationship of input data that are the material of the processing object, the pre-processed part data, and the laser beam parameter, to output data that is the post-processed part data after irradiation with the laser beam in relation to the input data.

The machine learning method according to this aspect of the present disclosure performs deep learning by using the material of the processing object, the laser beam parameter showing the property of the laser beam which the processing object is irradiated with, and the pre-processed part data and the post-processed part data that respectively reflect the laser processing-involved three-dimensional shapes of the processed part before and after irradiation of the processing object with the laser beam. The machine learning method then obtains, as a result of this deep learning (as a learning result), the first relationship of the input data that are the material of the processing object, the pre-processed part data, and the laser beam parameter to the output data that is the post-processed part data after irradiation with the laser beam in relation to the input data. The pre-processed part data and the post-processed part data herein denote the data reflecting the laser processing-involved three-dimensional shapes of the processed part before and after irradiation of the processing object with the laser beam. Accordingly, the pre-processed part data and the post-processed part data include, for example, data before and after irradiation with laser beam prior to laser processing and in the course of laser processing, data before and after irradiation with laser beam in the course of laser processing, and data before and after irradiation with laser beam in the course of laser processing and after laser processing (after completion of processing).

The machine learning method of this aspect can thus learn the degree of processing of the processed part before and after irradiation with laser beam in the course of laser processing, the material of the processing object, and the parameter of the laser beam to irradiate the processing object, and can obtain, as the learning result, the first relationship of the input data that are the material of the processing object, the pre-processed part data, and the laser beam parameter to the output data that is the post-processed part data after irradiation with laser beam in relation to the input data. The "deep learning" in the machine learning method according to this aspect of the present disclosure uses the pre-processed part data and the post-processed part data and obtains the first relationship having the output data that is the post-processed part data, as the learning result. This "deep learning" is thus basically supervised learning. The "laser beam parameter" may be at least part of a wavelength, a pulse width, a pulse amplitude, a spot diameter, the number of pulses, and a fluence (pulse energy per unit area). The "pre-processed part data" and the "post-processed part data" may be at least part of three-dimensional shape data of the processed part, surface temperature distribution data of the processed part, and color distribution data of the processed part. This is because the surface temperature distribution data of the processed part and the color distribution data of the processed part indicate a change in temperature caused by laser beam irradiation and are expected reflect the likelihood of a change in three-dimensional shape or the influence on a change in three-dimensional shape. The color distribution data herein includes not only standard color distribution data but Raman spectral data and optical reflectance spectral data.

In the machine learning method of the above aspect, the machine learning method may further includes obtaining, as one learning result, a second relationship of input data that are the material of the processing object, the pre-processed part data, and the post-processed part data, based on the first relationship, to output data that is the laser beam parameter of laser beam required for irradiation to change a state of the processed part specified by the pre-processed part data to a state of the processed part specified by the post-processed part in relation to the input data. The machine learning method according to this aspect of the present disclosure can thus obtain, as the learning result, the second relationship of the input data that are the material of the processing object, the pre-processed part data, and the post-processed part data to the output data that is the laser beam parameter of the laser beam required for irradiation to change the state of the processed part specified by the pre-processed part data to the state of the processed part specified by the post-processed part in relation to the input data.

The present disclosure is also directed to a simulation apparatus used for a laser processing system that is configured to perform ablation processing by irradiating an object to be processed or a processing object with laser beam. The simulation apparatus is configured to output the output data relative to the input data by using the learning result obtained by the machine learning method according to any of the aspects of the present disclosure described above, that is, the first relationship of input data that are the material of the processing object, the pre-processed part data, and the laser beam parameter, to output data that is the post-processed part data after irradiation with the laser beam in relation to the input data, and the second relationship of input data that are the material of the processing object, the pre-processed part data, and the post-processed part data, based on the first relationship, to output data that is the laser beam parameter of laser beam required for irradiation to change a state of the processed part specified by the pre-processed part data to a state of the processed part specified by the post-processed part in relation to the input data.

The simulation apparatus according to this aspect of the present disclosure enables the post-processed part data after irradiation with laser beam in relation to the input data, to be output when the material of the processing object, the pre-processed part data and the laser beam parameter are specified as the input data. This simulation apparatus also enables the laser beam parameter of the laser beam required for irradiation to change the state of the processed part specified by the pre-processed part data to the state of the processed part specified by the post-processed part data in relation to the input data, to be output when the material of the processing object, the pre-processed part data, and the post-processed part data are specified as the input data. This configuration enables a simulation to be performed by using the learning results of the degree of processing of the processed part before and after irradiation with laser beam in the course of laser processing, the material of the processing object, and the parameter of the laser beam to irradiate the processing object.

The simulation apparatus of the above aspect may be configured to receive input of a shape of the processing object prior to processing and a target shape, to specify, as the input data, adjusted data of the laser beam parameter and a laser beam irradiation location according to a difference between a shape in the course of processing and the target shape, to specify, as the shape in the course of processing, the output data as a result of a processing simulation obtained by applying the learning result to the input data, and to repeat the processing simulation until the difference between the shape in the course of processing and the target shape enters a predetermined range. For example, the simulation apparatus according to this aspect of the present disclosure sets any laser beam parameter and any number of laser irradiation locations as initial values, specifies the material of the processing object, the shape prior to processing, and the like in addition to the initial values, as input data, and applies the processing simulation to the input data, so as to obtain output data (post-processed part data after irradiation with laser beam in relation to the input data). The simulation apparatus subsequently determines whether a difference between the obtained output data as a shape in the course of processing and the target shape is within a predetermined range. When the difference between the shape in the course of processing and the target shape is out of the predetermined range, the simulation apparatus adjusts the laser beam parameter and the laser irradiation locations according to the difference and specifies the adjusted laser beam parameter and laser irradiation locations, as adjusted input data. The simulation apparatus subsequently applies the processing simulation to the adjusted input data, so as to obtain output data. The process of adjusting the input data according to the difference between the shape in the course of processing and the target shape and the process of applying the processing simulation to the adjusted input data to obtain the output data are repeated until the difference between the shape in the course of processing (the output data) and the target shape enters the predetermined range. The number of repetitions of these processes and the laser beam parameter and the laser irradiation locations adjusted in every repetition are given as simulation results. In this case, the simulation results are obtained a plurality of times by changing the initial values. Accordingly, optimal values of laser processing can be determined by comparing the total energy, the processing time, the processing accuracy and the like by laser irradiation among the respective simulation results.

The present disclosure is also directed to a first laser processing system. The laser processing system includes a processing laser beam irradiation device configured to perform ablation processing by irradiating an object to be processed or a processing object with laser beam; a processed part data measuring device configured to measure processed part data that reflects a laser processing-involved three-dimensional shape of the processing object; and a control device configured to control the processing laser beam irradiation device. The control device performs learning by using the machine learning method according to any of the aspects of the present disclosure described above, that is, the control device performs deep learning by using a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, obtains, as one learning result, a first relationship of input data that are the material of the processing object, the pre-processed part data, and the laser beam parameter, to output data that is the post-processed part data after irradiation with the laser beam in relation to the input data, obtains, as one learning result, a second relationship of input data that are the material of the processing object, the pre-processed part data, and the post-processed part data, based on the first relationship, to output data that is the laser beam parameter of laser beam required for irradiation to change a state of the processed part specified by the pre-processed part data to a state of the processed part specified by the post-processed part in relation to the input data, and uses a result of the learning to control the processing laser beam irradiation device, based on the output data relative to the input data.

The first laser processing system according to this aspect of the present disclosure performs learning by using the machine learning method according to any of the aspects of the present disclosure described above and accordingly enables laser processing to be performed by using the learning results of the degree of processing of the processed part before and after irradiation with laser beam in the course of laser processing, the material of the processing object, and the parameter of the laser beam to irradiate the processing object. Furthermore, the first laser processing system learns the first relationship and the second relationship every time the laser processing is performed, thus enhancing the accuracy of laser processing.

The present disclosure is also directed to a second laser processing system. The laser processing system includes a processing laser beam irradiation device configured to perform ablation processing by irradiating an object to be processed or a processing object with laser beam; and a control device configured to control the processing laser beam irradiation device. The control device uses a learning result obtained by the machine learning method according to any of the aspects of the present disclosure described above, that is, the control device controls the processing laser beam irradiation device based on the output data relative to the input data by using the first relationship and second relationship. The control device performs deep learning by using a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, and obtains, as one learning result, a first relationship of input data that are the material of the processing object, the pre-processed part data, and the laser beam parameter, to output data that is the post-processed part data after irradiation with the laser beam in relation to the input data. The control device further obtains, as one learning result, a second relationship of input data that are the material of the processing object, the pre-processed part data, and the post-processed part data, based on the first relationship, to output data that is the laser beam parameter of laser beam required for irradiation to change a state of the processed part specified by the pre-processed part data to a state of the processed part specified by the post-processed part in relation to the input data.

The second laser processing system according to this aspect of the present disclosure uses the learning result obtained by the machine learning method according to any of the aspects of the present disclosure described above and accordingly enables laser processing to be performed by using the learning results of the degree of processing of the processed part before and after irradiation with laser beam in the course of laser processing, the material of the processing object, and the parameter of the laser beam to irradiate the processing object. As a result, this configuration enhances the accuracy of laser processing.

The present disclosure is also directed to a program that causes a computer to serve as a machine learning apparatus used for a laser processing system. The program includes a step of receiving input of a plurality of data comprising a material of a processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, and a step of performing deep learning by using the plurality of input data, so as to obtain, as one learning result, a first relationship of input data that are the material of the processing object, the pre-processed part data, and the laser beam parameter to output data that is the post-processed part data after irradiation with the laser beam in relation to the input data.

The program according to this aspect of the present disclosure receives the input of the plurality of data comprising the material of the processing object, the laser beam parameter showing the property of laser beam which the processing object is irradiated with, and the pre-processed part data and the post-processed part data that respectively reflect the laser processing-involved three-dimensional shapes of the processed part before and after irradiation of the processing object with the laser beam, and performs the deep learning by using the plurality of input data to obtain, as one learning result, the first relationship of the input data that are the material of the processing object, the pre-processed part data, and the laser beam parameter to the output data that is the post-processed part data after irradiation with the laser beam in relation to the input data. The pre-processed part data and the post-processed part data herein denote the data reflecting the laser processing-involved three-dimensional shapes of the processed part before and after irradiation of the processing object with the laser beam. Accordingly, the pre-processed part data and the post-processed part data include, for example, data before and after irradiation with laser beam prior to laser processing and in the course of laser processing, data before and after irradiation with laser beam in the course of laser processing, and data before and after irradiation with laser beam in the course of laser processing and after laser processing (after completion of processing). This configuration enables the computer to serve as the machine learning apparatus that learns the degree of processing of the processed part before and after irradiation with laser beam in the course of laser processing, the material of the processing object, and the parameter of the laser beam to irradiate the processing object. The "deep learning" uses the pre-processed part data and the post-processed part data and obtains the first relationship having the output data that is the post-processed part data, as the learning result. This "deep learning" is thus basically supervised learning. The "laser beam parameter" may be at least part of a wavelength, a pulse width, a pulse amplitude, a spot diameter, the number of pulses, and a fluence (pulse energy per unit area). The "pre-processed part data" and the "post-processed part data" may be at least part of three-dimensional shape data of the processed part, surface temperature distribution data of the processed part, and color distribution data of the processed part.

The program according to this aspect of the present disclosure may further comprise a step of obtaining, as one learning result, a second relationship of input data that are the material of the processing object, the pre-processed part data, and the post-processed part data, based on the first relationship, to output data that is the laser beam parameter of laser beam required for irradiation to change a state of the processed part specified by the pre-processed part data to a state of the processed part specified by the post-processed part in relation to the input data. This configuration enables the computer to serve as the machine learning apparatus that obtains, as the learning result, the second relationship of the input data that are the material of the processing object, the pre-processed part data, and the post-processed part data to the output data that is the laser beam parameter of the laser beam required for irradiation to change the state of the processed part specified by the pre-processed part data to the state of the processed part specified by the post-processed part in relation to the input data.

DESCRIPTION OF EMBODIMENTS

The following describes some aspects of the present disclosure with reference to an embodiment.

Embodiment

Figure 1:
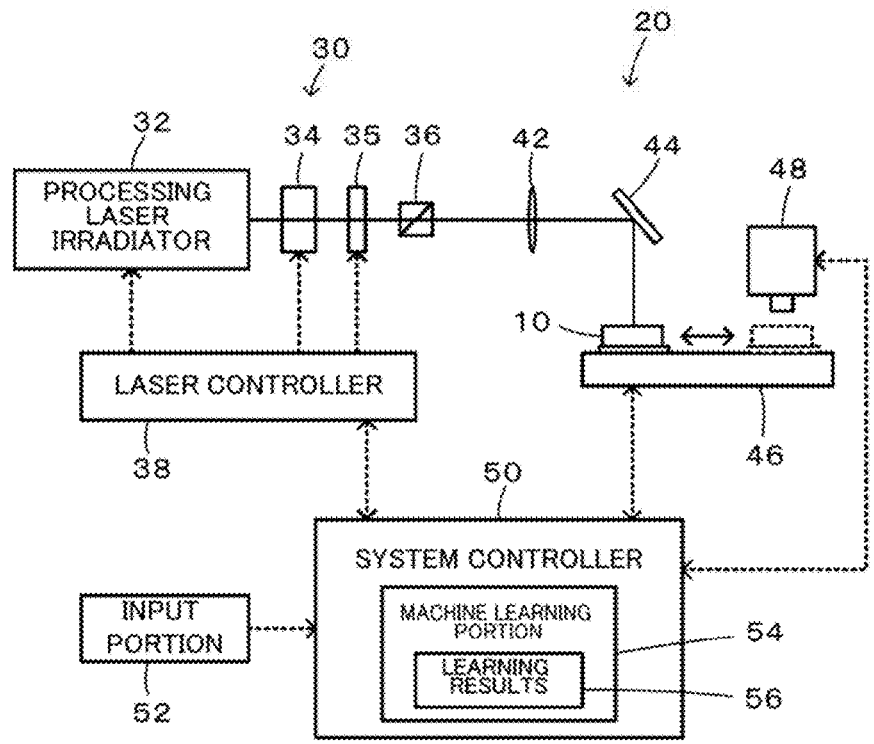
FIG. 1 is a configuration diagram illustrating the schematic configuration of a laser processing system according to one embodiment of the present disclosure.

FIG. 1 is a configuration diagram illustrating the schematic configuration of a laser processing system 20 according to one embodiment of the present disclosure. As illustrated, the laser processing system 20 of the embodiment includes a processing laser irradiation device 30 configured to output laser beam for processing; a motor-driven stage 46 configured such that an object to be processed or a processing object 10 irradiated with laser beam that is output from the processing laser irradiation device 30 and that has a focal point and an irradiation position adjusted by a focal lens 42 and a mirror 44, is placed on; a three-dimensional data measuring instrument 48 configured to measure three-dimensional shape data of a processed part of the processing object 10; and a system controller 50 configured to control the entire system.

The processing laser irradiation device 30 includes a processing laser irradiator 32 configured to output the laser beam for processing; a pulse picker 34 configured to extract an arbitrary number of pulses at an arbitrary timing from a pulse train of the laser beam from the processing laser irradiator 32; a half-wave plate 35 configured to adjust a polarization direction of the laser beam from the pulse picker 34; a polarizing beam splitter 36 configured to cause s-polarized light of the laser beam to be reflected and causes p-polarized light of the laser beam to be transmitted through; and a laser controller 38 configured to control these components.

The processing laser irradiator 32 is configured, for example, as a titanium sapphire laser irradiator that is capable of outputting laser beam (pulsed laser beam) having a wavelength of 800 nm, a variable pulse width of 35 fs to 10 ps, a repetition frequency of 1 kHz, a maximum output of 6 W, a maximum pulse energy of 6 mJ, and a fluence of 0.1 to 100 J/cm$^2$.

The half-wave plate 35 and the polarizing beam splitter 36 may be replaced by, for example, an acoustic optical modulator (AOM) or a neutral density filter:

The laser controller 38 is configured as a CPU-based microcomputer and includes, for example, a ROM, a RAM, a flash memory, input/output ports, and a communication port, in addition to a CPU, although not being illustrated. The laser controller 38 establishes communication with the system controller 50 via the communication port. The laser controller 38 controls the processing laser irradiator 32 such as to output laser beam having laser beam parameters based on a control signal from the system controller 50. The laser beam parameters used herein may be at least part of a wavelength, a pulse width, a pulse amplitude, a spot diameter, the number of pulses, and a fluence (pulse energy per unit area). Furthermore, the laser controller 38 controls the pulse picker 34 such as to provide the timing of extraction and the number of pulses extracted from the pulse train of laser beam based on the control signal from the system controller 50, and also controls the half-wave plate 35 and the polarizing beam splitter 36 such as to provide the polarization direction of laser beam based on the control signal from the system controller 50.

The motor-driven stage 46 is a stage configured to move the processing object 10 to a measurement position of the three-dimensional data measuring instrument 48. The motor-driven stage 46 used according to the embodiment had a position accuracy of 0.5 μm and a movable distance of 150 mm.

A device configured to measure a three-dimensional shape may be used for the three-dimensional measuring instrument 48: for example, a white light interference microscope, a scanning laser microscope, an X-ray CT (computed tomography) device, a step gauge, an AMF (atomic force microscope), or a Raman microscope. The three-dimensional measuring instrument 48 used according to the embodiment was a white light interference microscope having a vertical resolution of 1 nm and a horizontal resolution of 0.2 μm as measurement accuracy and a measurement time of 1 to 10 seconds. When the three-dimensional measuring instrument 48 uses an optical system identical with that of the laser beam, the motor-driven stage 46 may not be required. The three-dimensional shape data measured by the three-dimensional measuring instrument 48 is not limited to the three-dimensional shape data of the processed part but may also include surface temperature distribution data of the processed part and color distribution data of the processed part. This is because the surface temperature distribution data of the processed part and the color distribution data of the processed part indicate a change in temperature caused by laser beam irradiation and are expected to reflect the likelihood of a change in three-dimensional shape or the influence on a change in three-dimensional shape. The color distribution data herein includes not only standard color distribution data but Raman spectral data and optical reflectance spectral data.

The system controller 50 is configured as a CPU-based microcomputer and includes, for example, a ROM, a RAM, a flash memory, a GPU (graphics processing unit), input/output ports, and a communication port, in addition to a CPU, although not being illustrated. The system controller 50 functionally has an input portion 52 such as a keyboard and a mouse and a machine learning portion 54. The system controller 50 receives, for example, input data from the input portion 52, a position signal of the processing object 10 on the motor-driven stage 46, and three-dimensional measurement data from the three-dimensional measuring instrument 48 via the input port. The system controller 50 also output, for example, a drive control signal to the motor-driven stage 46 and a drive control signal to the three-dimensional measuring instrument 48 via the output port. Moreover, the system controller 50 establishes communication with the laser controller 38 to obtain the laser beam parameters of the laser beam output from the processing laser irradiation device 30.

Figure 2:
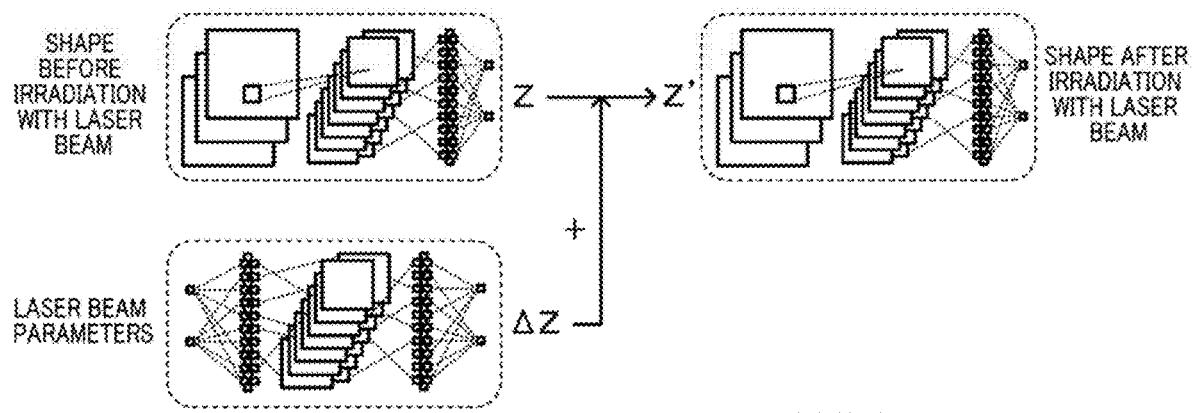
FIG. 2 is a diagram schematically illustrating deep learning according to the embodiment.

The machine learning portion 54 performs deep learning by using learning data that includes the material of the processing object 10, the laser beam parameters of the laser beam which the processed part of the processing object 10 is irradiated with, and three-dimensional shape data of the processed part before and after irradiation with the laser beam. When the material of the processing object 10, the laser beam parameters of the laser beam which the processed part of the is processing object 10 irradiated with, the and three-dimensional shape data of the processed part before irradiation with the laser beam are given as first input data, a relationship used for estimating first output data that is three-dimensional shape data of the processed part after irradiation with the laser beam, is obtained as a first learning result and is stored as learning results 56. FIG. 2 is a diagram schematically illustrating deep learning according to the embodiment. As illustrated, the deep learning of the embodiment is supervised learning of a convolutional neural network with the input of the three-dimensional shape data of the processed part after irradiation with the laser beam, and the input laser beam parameters work as a feature vector. According to the embodiment, when the material of the processing object 10 and the three-dimensional shape data of the processed part before and after irradiation with the laser beam are given as second input data, based on the first learning result, a relationship used for estimating second output data that is laser beam parameters of laser beam which the processed part of the processing object 10 is to be irradiated with, is obtained as a second learning result and is also stored as the learning results 56.

The laser processing system 20 of the embodiment serves as a laser processing system configured to perform laser processing by irradiating the processed part of the processing object 10 placed on the motor-driven stage 46 with laser beam, and also serves as a machine learning system used for the laser processing system and configured to operate the motor-driven stage 46 and the three-dimensional measuring instrument 48 such as to obtain three-dimensional shape data and to activate the machine learning portion 54 such as to perform deep learning, every time the processing object 10 placed on the motor-driven stage 46 is irradiated with laser beam. Moreover, the laser processing system 20 of the embodiment further serves as a simulation apparatus used for the laser processing system and configured to receive the first input data and the second input data from the input portion 52 and the like, to apply the first learning result and the second learning result stored as the learning results 56 by the machine learning portion 54 to these first input data and second input data, and to output the first output data and the second output data.

Figure 3:
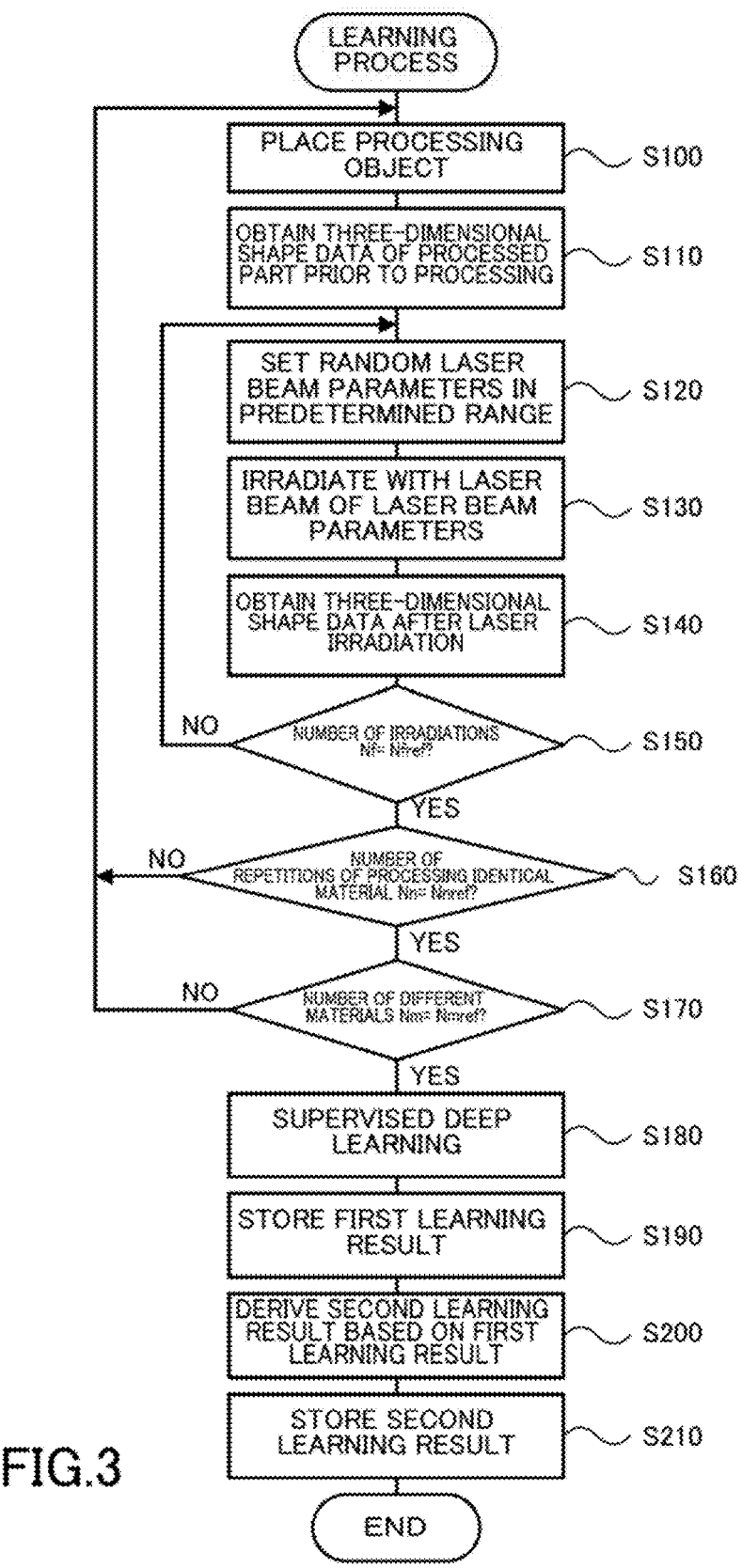
FIG. 3 is a flowchart showing one example of the learning process performed by the system controller according to the embodiment.
Figure 4:
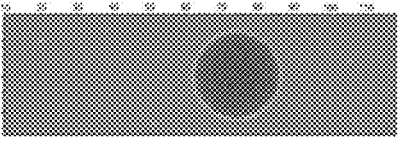
FIG. 4 illustrates one example of three-dimensional shape data after each irradiation with laser beam when irradiation of a random irradiation position with laser beam of random laser beam parameters was repeated seven times in the course of obtaining the learning data.

The following describes a learning process when the laser processing system 20 of the embodiment is made to serve as the machine learning system used for the laser processing system. FIG. 3 is a flowchart showing one example of the learning process performed by the system controller 50 of the laser processing system 20 according to the embodiment. In the learning process, the processing object 10 is first placed on the motor-driven stage 46 (step S100), and the three-dimensional measuring instrument 48 is operated to obtain three-dimensional shape data of the processed part prior to laser processing (step S110). The learning process subsequently sets random laser beam parameters at a random irradiation position in a predetermined range (for example, in a range that can be irradiated with laser beam) (step S120), irradiates the set irradiation position with laser beam of the set laser beam parameters (step S130), and activates the three-dimensional measuring instrument 48 to obtain three-dimensional shape data after irradiation with the laser beam (step S140). This series of processing of steps S120 to S140 is repeatedly performed, until a number of irradiations Nf becomes equal to a reference value Nfref (for example, 100 times or 200 times) (step S150). FIG. 4 illustrates one example of three-dimensional shape data after each irradiation with laser beam when irradiation of a random irradiation position with laser beam of random laser beam parameters was repeated seven times in the course of obtaining the learning data. In the diagram, the color strength indicates the processing depth of the processed part. As clearly understood from the illustration, the random irradiation positions of the processing object 10 were irradiated with the laser beams of the random laser beam parameters. The laser beam used for the experiment of FIG. 4 had random pulse energy in the range of 0.1 µJ to 100 µJ.

This series of processing (the processing of steps S120 to S150) is repeatedly performed with starting from the process of placing new processing object 10 on the motor-driven stage 46 at step S100, until a number of repetitions Nn of processing the processing object 10 of an identical material becomes equal to a reference value Nnref (for example, 20 times or 30 times) (step S160) and a number of different materials Nm of the processing object 10 becomes equal to a reference value Nmref (for example, 5 or 10) (step S170). The material of the processing object 10 may be, for example, quartz, copper, aluminum carbon fiber reinforced plastic (CFRP), sapphire, or silicon. When the reference value Nfref of the number of irradiations Nf is set to 200 times, the reference value Nnref of the number of repetitions Nn of processing the processing object 10 of the identical material is set to 20 times, and the reference value Nmref of the number of different materials Nm of the processing object 10 is set to 5, the total number of the learning data is twenty thousand (200×20×5). The learning data herein includes the laser beam parameters and the three-dimensional shape data before and after irradiation with the laser beam.

When obtaining the learning data as described above, the learning process performs supervised deep learning for the obtained learning data with specifying the laser beam parameters as a feature vector Z and specifying the three-dimensional shape data after irradiation with the laser beam as a solution of an example (step S180). The learning process accordingly gives the material of the processing object 10, the laser beam parameters of the laser beam which the processed part of the processing object 10 is irradiated with, and the three-dimensional shape data of the processed part before irradiation with the laser beam, as the first input data, obtains a relationship used for estimating the first output data that is the three-dimensional shape data of the processed part after irradiation with the laser beam, as the first learning result, and stores the obtained first learning result (step S190). The learning process subsequently gives the material of the processing object 10 and the three-dimensional shape data of the processed part before and after irradiation with the laser beam, as the second input data, based on the first learning result, derives a relationship used for estimating the second output data that is the laser beam parameters of the laser beam which the processed part of the processing object 10 is to be irradiated with, as the second learning result (step S200), stores the derived second learning result (step S210), and is then terminated.

Figure 5:
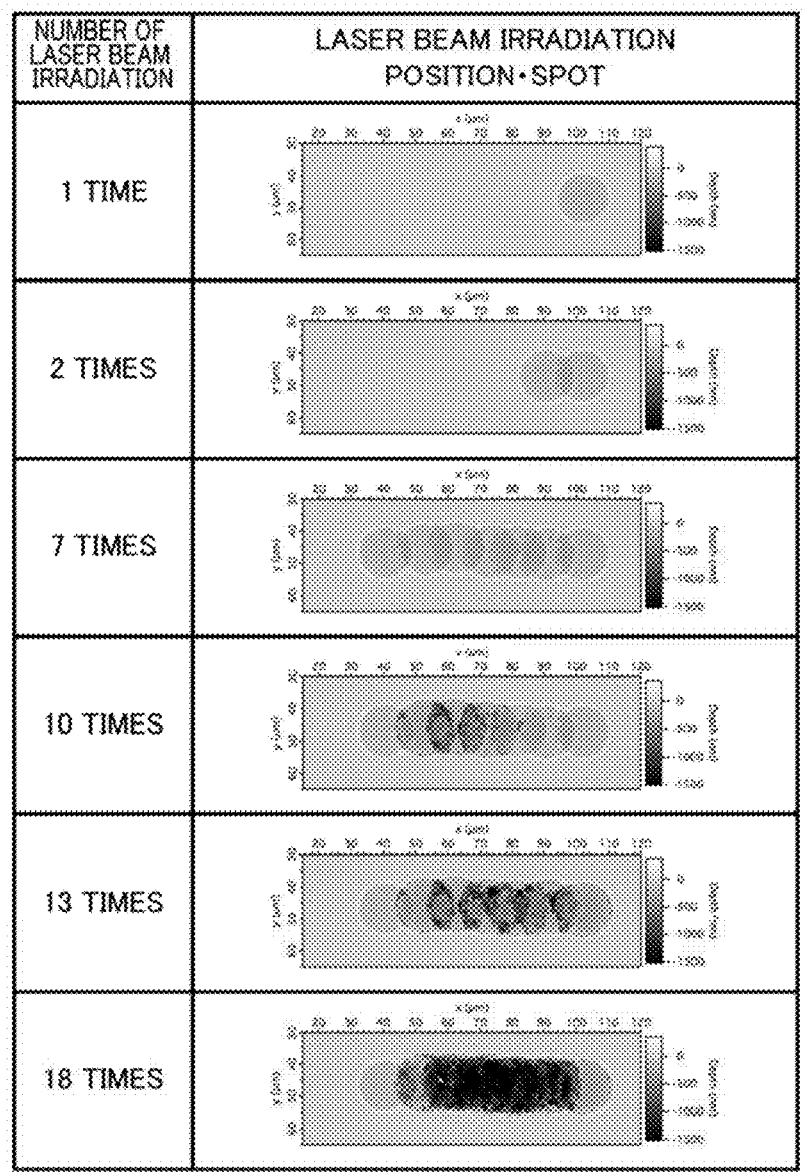
FIG. 5 is a diagram illustrating laser beam irradiation states in the process of successively irradiating a processing object with laser beam, while moving an irradiation position by every 10 μm and doubling back the irradiation position after irradiation with laser beam every seven times.
Figure 6:
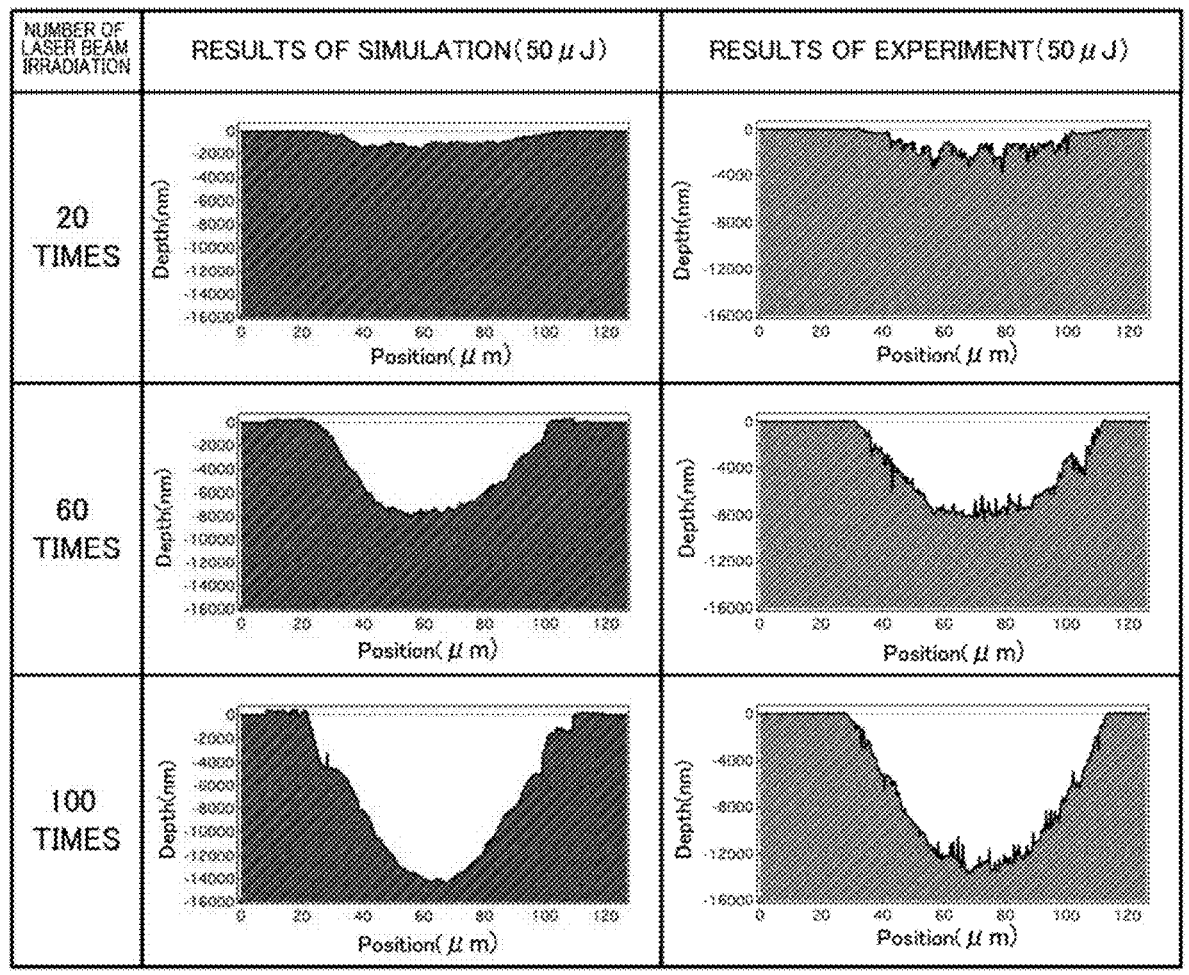
FIG. 6 illustrates the results of a simulation and the results of an experiment with regard to the processing depths of the processed part at the respective positions in the doubling-back direction after irradiation with the laser beam having the pulse energy of 50 μJ respective numbers of times.
Figure 7:
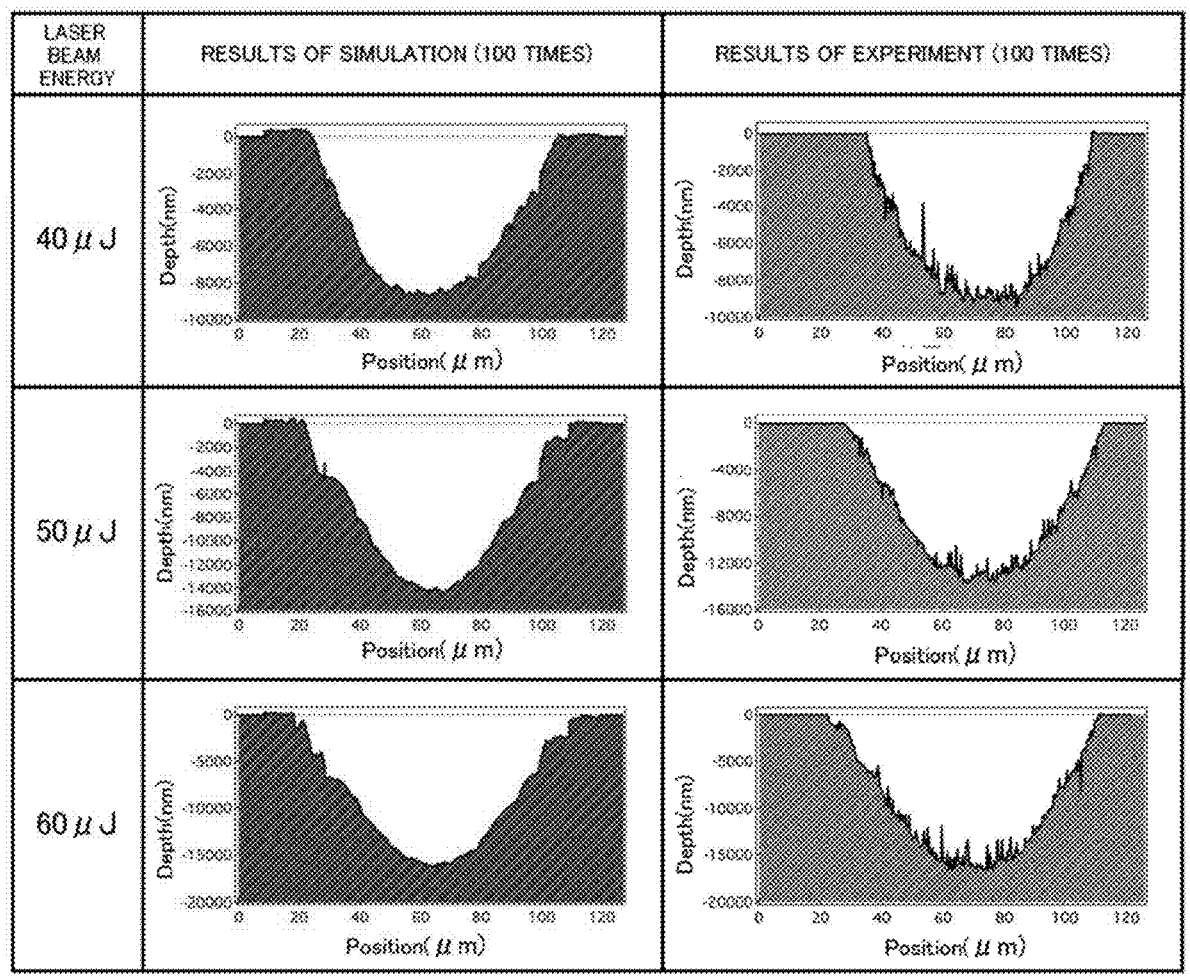
FIG. 7 illustrates the results of a simulation and the results of an experiment with regard to the processing depths of the processed part at the respective positions in the doubling-back direction when the processed part was irradiated with the laser beam having each of the pulse energies of 40 μJ, 50 μJ, and 60 μJ a hundred times.

The following describes the results of a simulation and the results of an experiment based on the learning results obtained by the laser processing system 20 of the embodiment. The simulation and the experiment successively irradiated the processing object 10 made of a quartz material with laser beam having a wavelength of 800 nm, a spot diameter of 26 µm, a pulse width of 35 fs, and one of pulse energies of 40 µJ, 50 µJ, and 60 µJ, with moving the irradiation position by every 10 µm and doubling back the irradiation position after irradiation with laser beam every seven times as shown in FIG. 5, and determined the processing depths of the processed part at the respective positions in a doubling-back direction after each irradiation with laser beam. The results of the experiment are given as measurement values by the three-dimensional 1 measuring instrument 48. FIG. 6 illustrates the results of a simulation and the results of an experiment with regard to the processing depths of the processed part at the respective positions in the doubling-back direction after irradiation with the laser beam having the pulse energy of 50 µJ respective numbers of times. As illustrated, the results of the simulation agree well with the results of the experiment. FIG. 7 illustrates the results of a simulation and the results of an experiment with regard to the processing depths of the processed part at the respective positions in the doubling-back direction when the processed part was irradiated with the laser beam having each of the pulse energies of 40 µJ, 50 µJ, and 60 µJ a hundred times. FIG. 7 has different scales on the ordinate for the respective pulse energies of 40 µJ, 50 µJ, and 60 µJ. The results of the simulation agree well with the results of the experiment. This proves that machine learning by the laser processing system 20 of the embodiment and the results of the learning are appropriate.

Figure 8:
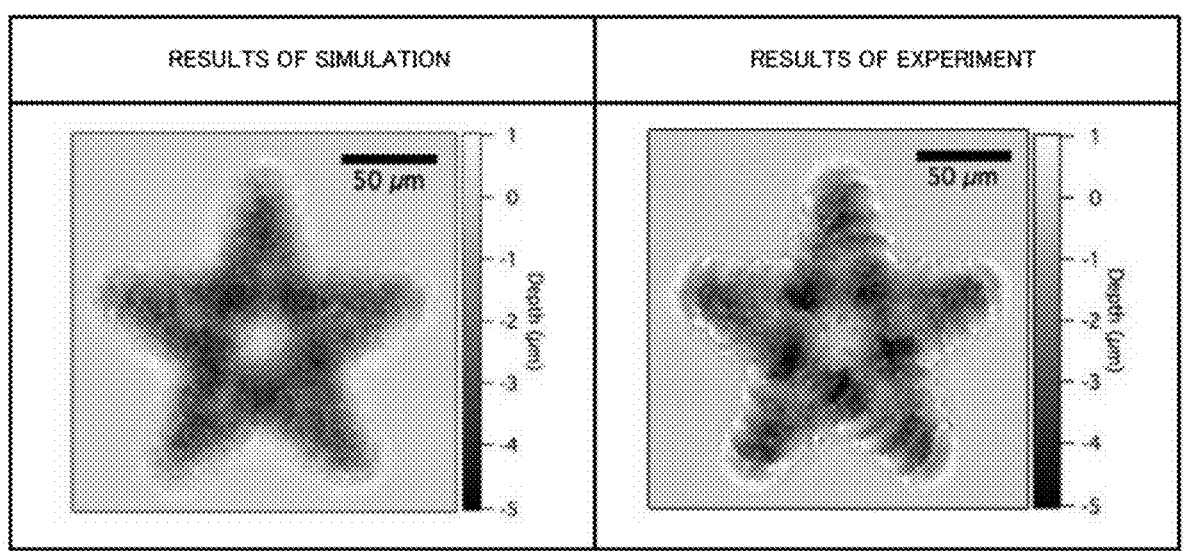
FIG. 8 is a diagram illustrating the result of a simulation and the result of an experiment with regard to the processing depths at respective positions in the case of irradiating the processing object made of a silicon material with laser beam along a star shape.

FIG. 8 is a diagram illustrating the result of a simulation and the result of an experiment with regard to the processing depths at respective positions in the case of irradiating the processing object 10 made of a silicon material with laser beam having a wavelength of 800 nm, a spot diameter of 26 µm, a pulse width of 35 fs, and a pulse energy of 50 µJ five hundred times, with moving the irradiation position by every 12.5 µm along a star shape of 125 µm in each side. In the diagram, the color strength indicates the processing depth. As illustrated, the result of the simulation agrees well with the result of the experiment with respect to the shape of the processing depth (the average depth, the shape of the outer circumference, and the greater depths at intersections of the respective line segments).

The laser processing system 20 of the embodiment described above performs deep learning by using the material of the processing object 10, the laser beam parameters showing the properties of the laser beam which the processing object is irradiated with, and the three-dimensional shape data of the processed part before and after irradiation of the processing object 10 with the laser beam. This process gives the material of the processing object 10, the laser beam parameters of the laser beam which the processed part of the processing object 10 is irradiated with, and the three-dimensional shape data of the processed part before irradiation with laser beam, as the first input data, and obtains the relationship used for estimating the first output data that is the three-dimensional shape data of the processed part after irradiation with laser beam, as the first learning result. This configuration accordingly enables the relationship between the three-dimensional shape data of the processed part before and after irradiation with the laser beam, the material of the processing object 10, and the laser beam parameters of the laser beam in the course of laser processing to be learnt. This configuration also enables the three-dimensional shape of the processed part of the processing object 10 changed by irradiation with laser beam to be estimated.

Furthermore, the laser processing system 20 of the embodiment gives the material of the processing object 10 and the three-dimensional shape data of the processed part before and after irradiation with the laser beam, as the second input data, based on the first learning result and derives the relationship used for estimating the second output data that is the laser beam parameters of the laser beam which the processed part of the processing object 10 is to be irradiated with, as the second learning result. This configuration enables the laser beam parameters of the laser beam required for processing the processed part of the processing object 10 to a desired shape to be estimated.

The learning process in the laser processing system 20 of the embodiment obtains the learning data with regard to the processing objects 10 of different materials, in addition to the processing object 10 of an identical material. A modification may be configured to obtain the learning data with regard to only the processing object of an identical material.

The learning process in the laser processing system 20 of the embodiment obtains the three-dimensional shape data of the processed part after each irradiation with laser beam. A modification may be configured to obtain three-dimensional shape data of the processed part after irradiation with laser beam every multiple number of times or after irradiation with laser beam every random number of times. In this modification, the laser beam which the processed part is irradiated with every multiple number of times or the laser beam which the processed part is irradiated with every random number of times may have identical laser beam parameters or may have different laser beam parameters.

The machine learning in the laser processing system 20 of the embodiment uses the laser beam having the wavelength of 800 nm. Laser beam in a wavelength range where light-induced electronic excitation affects the processing or more specifically in a wavelength range of 193 nm to 5 μm may also be applicable to the machine learning.

The machine learning in the laser processing system 20 of the embodiment uses the laser beam having the pulse width of 35 fs. Laser beam in a range of short pulse to ultrashort pulse or more specifically in a range of 10 fs to 100 ns may also be applicable to the machine learning.

The laser processing system 20 of the embodiment performs machine learning when the learning process of FIG. 3 is performed. After termination of the learning process of FIG. 3, machine learning may be performed by using learning data accumulated by that time, every time laser processing is performed or at a predetermined timing.

The laser processing system 20 of the embodiment is provided with the processing laser irradiation device 30, the motor-driven stage 46, the three-dimensional data measuring instrument 48, and the system controller 50 and is configured to obtain the three-dimensional shape data of the processed part after each irradiation with laser beam and obtain the learning data. When the present disclosure is implemented as an aspect of a machine learning apparatus, the machine learning apparatus may have a hardware configuration similar to that of the laser processing system 20 of the embodiment or may have a hardware configuration including only the system controller 50. In the latter case, the processing of steps S100 to S170 in the learning process of FIG. 3 may be performed in advance by another device to obtain the material of the processing object 10, the laser beam parameters showing the properties of the laser beam which the processing object 10 is irradiated with, and the three-dimensional shape data of the processed part before and after irradiation of the processing object 10 with laser beam. The machine learning apparatus may then receive the input of these learning data.

When the present disclosure is implemented as an aspect of a program that causes a computer to serve as a machine learning apparatus, the program may be performed by the system controller 50 included in the laser processing system 20 of the embodiment that is provided with the processing laser irradiation device 30, the motor-driven stage 46, the three-dimensional data measuring instrument 48 and the like, in addition to the system controller 50 serving as this machine learning apparatus. The program in this case may be the flowchart of machine learning shown in FIG. 3. In the case where the machine learning apparatus is not provided with the processing laser irradiation device 30, the motor-driven stage 46, the three-dimensional data measuring instrument 48 or the like but is provided with only a microcomputer corresponding to the system controller 50, the processing of steps S100 to S170 in the learning process of FIG. 3 may be performed in advance by another device to obtain the material of the processing object 10, the laser beam parameters showing the properties of the laser beam which the processing object 10 is irradiated with, and the three-dimensional shape data of the processed part before and after irradiation of the processing object 10 with laser beam. The program may receive the input of these learning data.

When the present disclosure is implemented as an aspect of a simulation apparatus, the simulation apparatus may be configured to perform deep learning with input of the learning data or may be configured to store only the results of learning obtained by deep learning.

Figure 9:
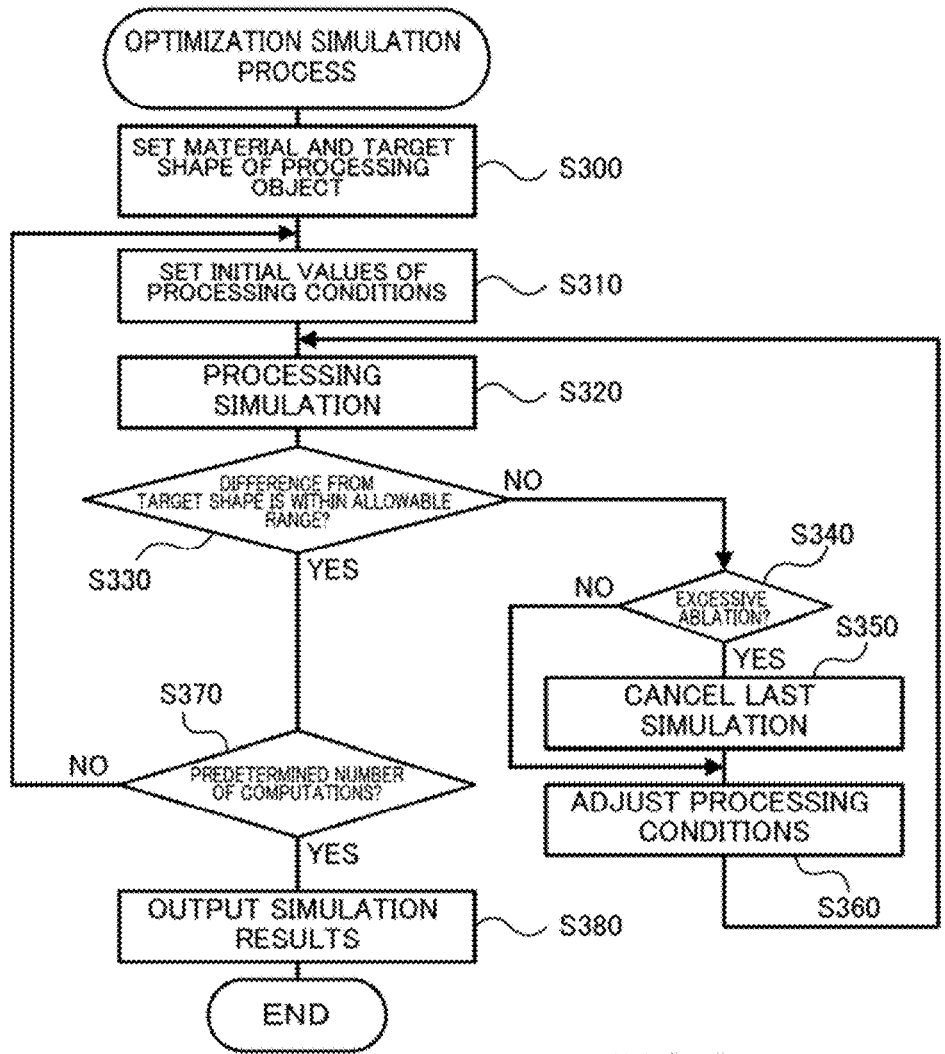
FIG. 9 is a flowchart showing one example of an optimization simulation process.

The following describes one example of an application in the case where the present disclosure is implemented as an aspect of a simulation apparatus. FIG. 9 is a flowchart showing one example of an optimization simulation process that simulates optimization of laser beam parameters and laser irradiation locations in the laser processing of a processing object. This optimization simulation process first sets a material and a target shape of a processing object (step S300) and sets initial values of processing conditions (step S310). The processing conditions herein include the laser beam parameters and the laser irradiation locations. The wavelength, the pulse width, the pulse amplitude, the spot diameter, the number of pulses, and the fluence may be determined as the initial values of the laser beam parameters. The laser irradiation locations may be determined according to the number of irradiation pulses and the target shape.

After setting the initial values of the processing conditions, the optimization simulation process specifies the material of the processing object, the laser beam parameters, and the laser irradiation locations as input data and performs a processing simulation based on the input data (step S320). This processing simulation applies the first learning result obtained by the learning process of FIG. 3 to the input data and thereby computes three-dimensional shape data of the processed part (a shape in the course of processing) after irradiation with laser beam based on the input data. The optimization simulation process subsequently computes a difference between the computed three-dimensional shape data of the processed part (the shape in the course of processing) and the target shape and determines whether this difference is within an allowable range (step S330). When it is determined that the difference is out of the allowable range, the optimization simulation process subsequently determines whether ablation of the processed part by laser processing is excessive ablation (step S340). When it is determined that the ablation is not excessive ablation, the optimization simulation process adjusts the processing conditions, based on the difference between the shape in the course of processing and the target shape (step S360). One exemplified procedure of adjusting the processing conditions may use the initial values of the laser beam parameters and adjust only the laser irradiation locations such that a location having a large difference between the shape in the course of processing and the target shape is irradiated with laser beam. Another procedure may adjust both the laser beam parameters and the laser irradiation locations. After adjusting the processing conditions, the optimization simulation process goes back to step S320 to perform the processing simulation using the adjusted processing conditions as input data. Such adjustment of the processing conditions and the processing simulation are repeated until the difference between the shape in the course of processing and the target shape enters the allowable range.

When it is determined at step S340 that the ablation is excessive ablation, the optimization simulation process cancels the last processing simulation (step S350), makes an adjustment that is different from the last adjustment of the processing conditions, based on the difference between the shape in the course of processing as the result of a previous processing simulation performed before last and the target shape (step S360) and then goes back to step S320. This series of processing suppresses excessive ablation.

When it is determined at step S330 that the difference between the shape in the course of processing and the target shape is within the allowable range, the optimization simulation process subsequently determines whether a number of repetitions of the processing of steps S310 to S370 has reached a predetermined number of computations (step S370). When it is determined that the number of repetitions has not yet reached the predetermined number of computations, the optimization simulation process goes back to the process of setting the initial values of the processing conditions at step S310. In this case, with regard to the initial values of the processing conditions, the fluence in the laser beam parameters may be increased (or decreased) by a predetermined amount or the number of pulses may be increased (or decreased) by a predetermined number, every time the processing is repeated.

When it is determined at step S370 that the number of repetitions of the processing of steps S310 to S370 has reached the predetermined number of computations, the optimization simulation process outputs the respective simulation results obtained by repetition of the processing of steps S310 to S370 the predetermined number of times (step S380) and is then terminated. The optimization of each simulation result may be determined according to the degree of a difference between the three-dimensional shape data by laser processing and the target shape (processing accuracy), the energy required for laser processing, the time required for laser processing, and the like.

Figure 10:
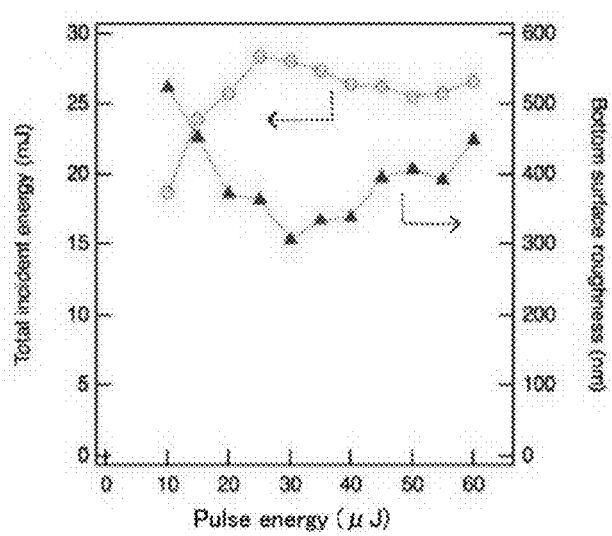
FIG. 10 is a graph showing one example of simulation results with regard to a relationship between pulse energy and total energy and a relationship between pulse energy and bottom surface roughness in the process of laser processing.
Figure 11:
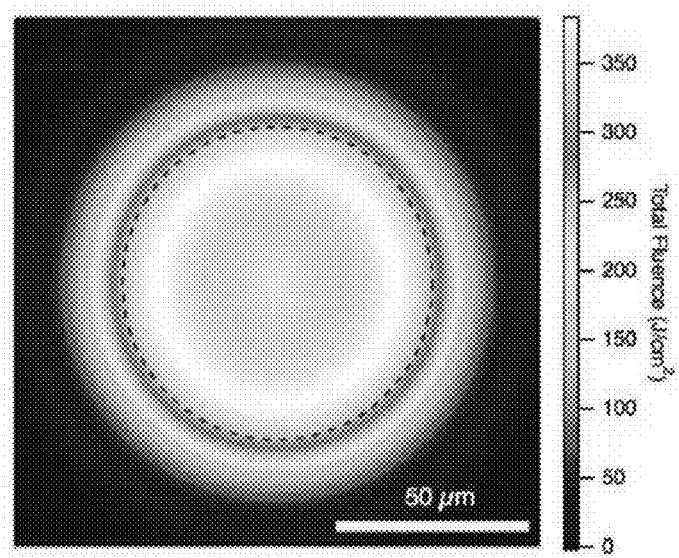
FIG. 11 illustrates a total fluence in laser irradiation.
Figure 12:
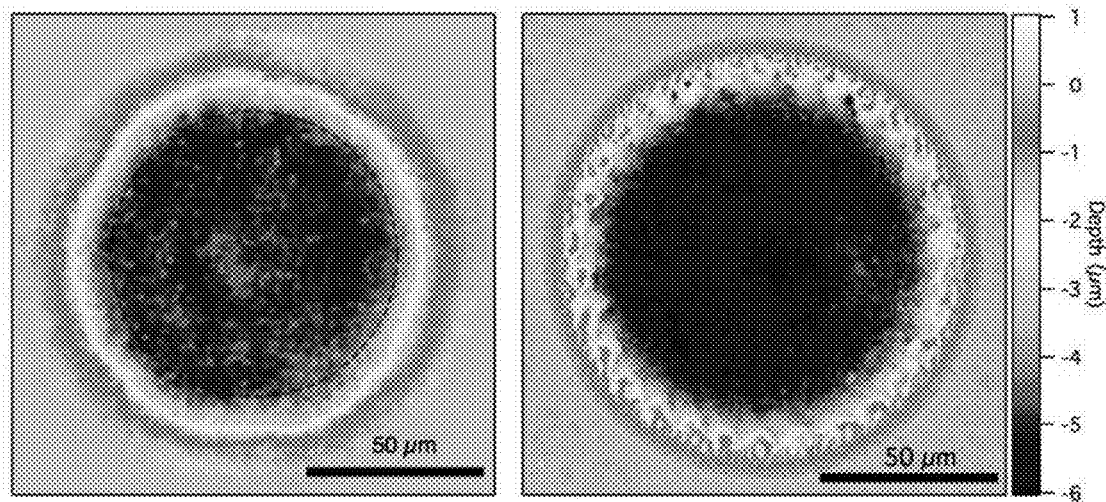
FIG. 12 illustrates three-dimensional shape data by the simulation result and three-dimensional shape data obtained by laser processing using the processing conditions of the simulation result.
Figure 13:
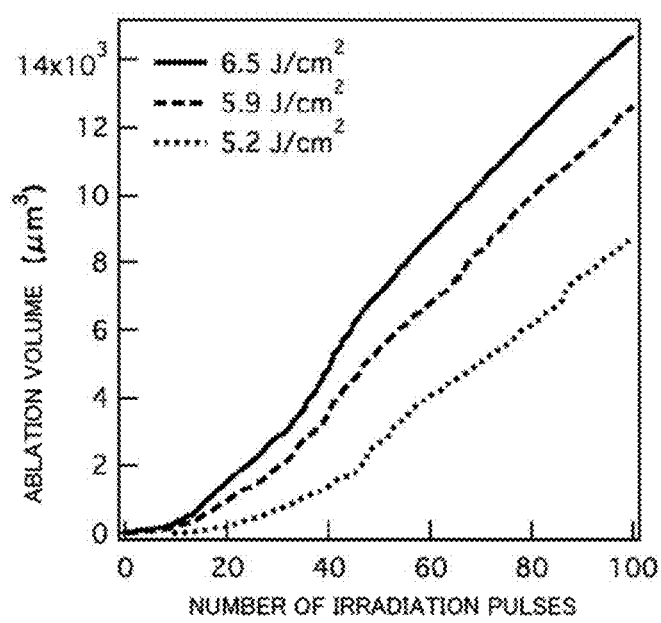
FIG. 13 is a diagram showing relationships among the number of irradiation pulses of laser beam, the fluence, and the ablation volume ablating from the processing object.

The simulation was performed with regard to laser processing of a processing object 10 made of a silicon material to provide a hole in a cylindrical shape having a diameter of 80 µm and a depth of 5 µm as a target shape. The laser irradiation locations were determined to be approximately equalized on a plane. FIG. 10 shows one example of simulation results with regard to a relationship between pulse energy and total energy and a relationship between pulse energy and bottom surface roughness. As illustrated, the total energy of laser processing is maximized at the pulse energy of about 25 µJ. The bottom surface roughness is minimized at the pulse energy of about 30 µJ. FIG. 11 illustrates a total fluence in laser irradiation. In this diagram, the total fluence has a value 0 on the outermost side and is maximized in a thinnest location slightly inside of a circle of a broken line. FIG. 12 illustrates three-dimensional shape data by the simulation result and three-dimensional shape data obtained by laser processing using the processing conditions of the simulation result. The left side drawing shows three-dimensional shape data by the simulation result, and the right side drawing shows three-dimensional shape data obtained y actual laser processing. As clearly understood from the illustration, the three-dimensional shape data by the simulation result agree well with the three-dimensional shape data obtained by actual laser processing.

As described above, when the present disclosure is implemented as the aspect of the simulation apparatus, the three-dimensional shape data obtained by the simulation result agrees with the three-dimensional shape data obtained by actual laser processing at high accuracy. This configuration thus allows for optimization of laser processing.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of laser processing system.

The invention claimed is:

1. A machine learning method used for controlling a laser processing system that is configured to perform ablation processing by irradiating an object to be processed or a processing object with laser beam, the machine learning method comprising:
performing deep learning using a neural network by using a plurality of sequential data sets, each comprising a respective set of values of a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam,
obtaining, as a result of the deep learning, a trained neural network having a learned first relationship of an input to the neural network that is the material of the processing object, the pre-processed part data, and the laser beam parameter, to an output from the neural network, the output being the post-processed part data after irradiation with the laser beam computed based on the input, wherein
the post-processed part data from one data set of the plurality of sequential data sets serves as the pre-processed part data in a subsequent data set of the plurality of sequential data sets,
the machine learning method includes:
using the trained neural network to perform one or more processing simulations, estimating, based on the one or more processing simulations, a value of the laser beam parameter for obtaining a target three-dimensional shape on a given object, and controlling a processing laser beam irradiation device to perform an ablation process on the given object based on the estimated value of the laser beam parameter, and the pre-processed part data includes three-dimensional shape measurements of a processed part obtained from the processing object prior to a respective laser beam irradiation.

2. The machine learning method according to claim 1, further comprising:

obtaining, as one learning result, a second relationship of input data that are the material of the processing object, the pre-processed part data, and the post-processed part data, based on the first relationship, to output data that is the laser beam parameter of laser beam required for irradiation to change a state of a second processed part specified by the pre-processed part data to a state of the processed part specified by the post-processed part data in relation to the input data.

3. The machine learning method according to claim 1, wherein the laser beam parameter is at least one of a wavelength, a pulse width, a pulse amplitude, a number of pulses, and a fluence, and the pre-processed part data and the post-processed part data are at least one of three-dimensional data of the processed part, surface temperature distribution data of the processed part, and color distribution data of the processed part.

4. A simulation apparatus used for controlling a laser processing system that is configured to perform ablation processing by irradiating an object to be processed or a processing object with laser beam, the simulation apparatus being configured to output an output relative to an input by using a learning result obtained by a machine learning method of:

performing deep learning using a neural network by using a plurality of sequential data sets, each comprising a respective set of values of a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, obtaining, as a result of the deep learning, a trained neural network having a learned first relationship of the input to the neural network that is the material of the processing object, the pre-processed part data, and the laser beam parameter, to output from the neural network, the output being the post-processed part data after irradiation with the laser beam computed based on the input, wherein the post-processed part data from one data set of the plurality of sequential data sets serves as the pre-processed part data in a subsequent data set of the plurality of sequential data sets, the machine learning method includes:

using the trained neural network to perform one or more processing simulations, estimating, based on the one or more processing simulations, a value of the laser beam parameter for obtaining a target three-dimensional shape on a given object, and controlling a processing laser beam irradiation device to perform an ablation process on the given object based on the estimated value of the laser beam parameter, and the pre-processed part data includes three-dimensional shape measurements of the processed part obtained from the processing object prior to a respective laser beam irradiation.

5. The simulation apparatus according to claim 4, wherein the machine learning method obtains, as one learning result, a second relationship of input data that are the material of the processing object, the pre-processed part data, and the post-processed part data, based on the first relationship, to output data that is the laser beam parameter of laser beam required for irradiation to change a state of a second processed part specified by the pre-processed part data to a state of the processed part specified by the post-processed part data in relation to the input data.

6. The simulation apparatus according to claim 4, wherein the laser beam parameter is at least one of a wavelength, a pulse width, a pulse amplitude, a number of pulses, and a fluence, and the pre-processed part data and the post-processed part data are at least one of three-dimensional data of the processed part, surface temperature distribution data of the processed part, and color distribution data of the processed part.

7. The simulation apparatus according to claim 4, the simulation apparatus being configured to receive input of a shape of the given object prior to processing and a target shape, to specify, as input data, adjusted data of the laser beam parameter and a laser beam irradiation location according to a difference between a shape in the course of processing and the target shape, to specify, as the shape in the course of processing, output data as a result of a processing simulation obtained by applying the trained neural network to the input data, and to repeat the processing simulation until the difference between the shape in the course of processing and the target shape enters a predetermined range.

8. A laser processing system, comprising:

a processing laser beam irradiation device configured to perform ablation processing by irradiating an object to be processed or a processing object with laser beam; a processed part data measuring device configured to measure processed part data that reflects a laser processing-involved three-dimensional shape of the processing object; and a control device configured to control the processing laser beam irradiation device, wherein the control device performs learning by using a machine learning method of:

performing deep learning using a neural network by using a plurality of sequential data sets, each comprising a respective set of values of a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam, obtaining, as a result of the deep learning, a trained neural network having a learned first relationship of an input to the neural network that is the material of the processing object, the pre-processed part data, and the laser beam parameter, to an output from the neural network, the output being the post-processed part data after irradiation with the laser beam computed based on the input, wherein the post-processed part data from one data set of the plurality of sequential data sets serves as the pre-processed part data in a subsequent data set of the plurality of sequential data sets, the machine learning method includes:
 using the trained neural network to perform one or more processing simulations,
 estimating, based on the one or more processing simulations, a value of the laser beam parameter for obtaining a target three-dimensional shape on a given object, and
 controlling a processing laser beam irradiation device to perform an ablation process on the given object based on the estimated value of the laser beam parameter, and the pre-processed part data includes three-dimensional shape measurements of the processed part obtained from the processing object prior to a respective laser beam irradiation.

9. The laser processing system according to claim 8, wherein the machine learning method obtains, as one learning result, a second relationship of input data that are the material of the processing object, the pre-processed part data, and the post-processed part data, based on the first relationship, to output data that is the laser beam parameter of laser beam required for irradiation to change a state of a second processed part specified by the pre-processed part data to a state of the processed part specified by the post-processed part data in relation to the input data.

10. The laser processing system according to claim 8, wherein the laser beam parameter is at least one of a wavelength, a pulse width, a pulse amplitude, a number of pulses, and a fluence, and
the pre-processed part data and the post-processed part data are at least one of three-dimensional data of the processed part, surface temperature distribution data of the processed part, and color distribution data of the processed part.

11. A laser processing system, comprising:
a processing laser beam irradiation device configured to perform ablation processing by irradiating an object to be processed or a processing object with laser beam; and a control device configured to control the processing laser beam irradiation device, wherein
the control device performs deep learning by using a machine learning method of:
 performing deep learning using a neural network by using a plurality of sequential data sets, each comprising a respective set of values of a material of the processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam,
 obtaining, as a result of the deep learning, a trained neural network having a learned first relationship of an input to the neural network that is the material of the processing object, the pre-processed part data, and the laser beam parameter, to an output from the neural network, the output being the post-processed part data after irradiation with the laser beam computed based on the input, wherein the post-processed part data from one data set of the plurality of sequential data sets serves as the pre-processed part data in a subsequent data set of the plurality of sequential data sets, the machine learning method includes:
 using the trained neural network to perform one or more processing simulations,
 estimating, based on the one or more processing simulations, a value of the laser beam parameter for obtaining a target three-dimensional shape on a given object, and
 controlling a processing laser beam irradiation device to perform an ablation process on the given object based on the estimated value of the laser beam parameter, and the pre-processed part data includes three-dimensional shape measurements of the processed part obtained from the processing object prior to a respective laser beam irradiation.

12. The laser processing system according to claim 11, wherein the machine learning method obtains, as one learning result, a second relationship of input data that are the material of the processing object, the pre-processed part data, and the post-processed part data, based on the first relationship, to output data that is the laser beam parameter of laser beam required for irradiation to change a state of a second processed part specified by the pre-processed part data to a state of the processed part specified by the post-processed part data in relation to the input data.

13. The laser processing system according to claim 11, wherein the laser beam parameter is at least one of a wavelength, a pulse width, a pulse amplitude, a number of pulses, and a fluence, and
the pre-processed part data and the post-processed part data are at least one of three-dimensional data of the processed part, surface temperature distribution data of the processed part, and color distribution data of the processed part.

14. A non-transitory computer readable medium storing a program that causes a computer to serve as a machine learning apparatus used for controlling a laser processing system, the program comprising:
 receiving input of a plurality of sequential data sets, each comprising a respective set of values of a material of a processing object, a laser beam parameter showing a property of laser beam which the processing object is irradiated with, and pre-processed part data and post-processed part data that respectively reflect laser processing-involved three-dimensional shapes of a processed part before and after irradiation of the processing object with the laser beam;
 performing deep learning using a neural network by using the plurality of input data; and
 obtaining, as a result of the deep learning, a trained neural network having a learned first relationship of an input to the neural network that is the material of the processing object, the pre-processed part data, and the laser beam parameter to an output from the neural network, the output being the post-processed part data after irradiation with the laser beam computed based on the input, wherein the post-processed part data from one data set of the plurality of sequential data sets serves as the pre-processed part data in a subsequent data set of the plurality of sequential data sets, the machine learning method includes:

using the trained neural network to perform one or more processing simulations, estimating, based on the one or more processing simulations, a value of the laser beam parameter for obtaining a target three-dimensional shape on a given object, and controlling a processing laser beam irradiation device to perform an ablation process on the given object based on the estimated value of the laser beam parameter, and the pre-processed part data includes three-dimensional shape measurements of the processed part obtained from the processing object prior to a respective laser beam irradiation.

15. The non-transitory computer readable medium according to claim 14, the program further comprising:

a step of obtaining, as one learning result, a second relationship of input data that are the material of the processing object, the pre-processed part data, and the post-processed part data, based on the first relationship, to output data that is the laser beam parameter of laser beam required for irradiation to change a state of a second processed part specified by the pre-processed part data to a state of the processed part specified by the post-processed part data in relation to the input data.

16. The machine learning method according to claim 1, further comprising:

setting a target three-dimensional shape for a processing object;

setting processing object input data as (i) initial value laser beam parameters, (ii) the material of the processing object, and (iii) the pre-processed part data of the processing object;

performing a processing simulation by applying the first relationship to the processing object input data to estimate a three-dimensional shape being post-processed part data;

determining a difference between the target three-dimensional shape and the simulated post-processed part data;

executing parameter adjustment to adjust the laser beam parameters based on the difference;

repeating the processing simulation and the parameter adjustment until the difference falls below a threshold; and outputting a result including laser beam parameters at which the difference falls below the threshold.

17. The machine learning method according to claim 1, wherein the pre-processed part data and the post-processed part data have the same format.

18. The machine learning method according to claim 17, wherein the pre-processed part data and the post-processed part data each comprise either:

a set of numerical values representing a processing status at each position in three-dimensional space including the processing object, or a set of representative values obtained by projecting the processing status at each position in three-dimensional space onto specific coordinate axes.

* * * * *